(12) United States Patent
Nayyar et al.

(10) Patent No.: US 8,990,456 B2
(45) Date of Patent: Mar. 24, 2015

(54) METHOD AND APPARATUS FOR MEMORY WRITE PERFORMANCE OPTIMIZATION IN ARCHITECTURES WITH OUT-OF-ORDER READ/REQUEST-FOR-OWNERSHIP RESPONSE

(71) Applicant: Intel Corporation, Santa Clara, CA (US)

(72) Inventors: Raman Nayyar, Hillsboro, OR (US); Kenneth C. Holland, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/727,532

(22) Filed: Dec. 26, 2012

(65) Prior Publication Data
US 2013/0212336 A1 Aug. 15, 2013
US 2015/0006825 A9 Jan. 1, 2015

Related U.S. Application Data

(62) Division of application No. 11/323,765, filed on Dec. 30, 2005, now Pat. No. 8,341,360.

(51) Int. Cl.
G06F 3/00 (2006.01)
G06F 5/00 (2006.01)
G06F 12/08 (2006.01)
G10L 19/008 (2013.01)
H04S 3/02 (2006.01)

(52) U.S. Cl.
CPC .......... *G06F 12/0815* (2013.01); *G10L 19/008* (2013.01); *H04S 3/02* (2013.01)

USPC ................. 710/39; 710/5; 711/118; 709/232; 709/233

(58) Field of Classification Search
None
See application file for complete search history.

(56) References Cited

U.S. PATENT DOCUMENTS

| | | | |
|---|---|---|---|
| 5,193,150 A | 3/1993 | Takeuchi et al. | |
| 5,522,050 A | 5/1996 | Amini et al. | |
| 5,559,968 A | 9/1996 | Stancil et al. | |
| 5,638,534 A * | 6/1997 | Mote, Jr. ....................... | 711/158 |
| 5,751,983 A | 5/1998 | Abramson et al. | |
| 5,887,134 A * | 3/1999 | Ebrahim ....................... | 709/200 |
| 5,948,081 A | 9/1999 | Foster | |
| 6,041,376 A | 3/2000 | Gilbert et al. | |
| 6,163,835 A | 12/2000 | Todd et al. | |
| 6,247,102 B1 | 6/2001 | Chin et al. | |
| 6,292,807 B1 * | 9/2001 | Larson ................................. | 1/1 |
| 6,347,344 B1 | 2/2002 | Baker et al. | |
| 6,356,972 B1 * | 3/2002 | Chin et al. .................... | 710/310 |
| 6,463,510 B1 | 10/2002 | Jones et al. | |
| 6,721,854 B1 | 4/2004 | Asano et al. | |
| 6,823,405 B1 | 11/2004 | Askar | |
| 6,834,314 B1 | 12/2004 | Askar | |
| 6,917,992 B2 | 7/2005 | Grimsrud et al. | |
| 6,993,630 B1 * | 1/2006 | Williams et al. .............. | 711/137 |
| 7,124,231 B1 * | 10/2006 | Garner et al. ................. | 710/310 |

(Continued)

*Primary Examiner* — Michael Sun
(74) *Attorney, Agent, or Firm* — Blakely, Sokoloff, Taylor & Zafman LLP

(57) ABSTRACT

A block of data may be transferred to memory through a plurality of write operations, where each write operation is preceded by a protocol request and a protocol response. A plurality of protocol requests issued in a first order may elicit a corresponding plurality of protocol responses in a second order, and the write operations may be performed in yet a third order. Chipsets implementing the data write methods are also described and claimed.

6 Claims, 4 Drawing Sheets

(56) References Cited

U.S. PATENT DOCUMENTS

| | | |
|---|---|---|
| 7,127,573 B1 | 10/2006 | Strongin et al. |
| 7,296,008 B2 | 11/2007 | Passerini et al. |
| 7,298,746 B1 | 11/2007 | De La Iglesia et al. |
| 7,349,399 B1* | 3/2008 | Chen et al. .................... 370/394 |
| 7,509,482 B2* | 3/2009 | Takahashi et al. ............ 712/214 |
| 2002/0046331 A1* | 4/2002 | Davis et al. ................... 711/167 |
| 2003/0023782 A1* | 1/2003 | Arimilli et al. ................. 710/22 |
| 2003/0163649 A1 | 8/2003 | Kapur et al. |
| 2004/0003184 A1 | 1/2004 | Safranek et al. |
| 2004/0151177 A1 | 8/2004 | Burton et al. |
| 2004/0260891 A1 | 12/2004 | Jeddeloh et al. |
| 2005/0021884 A1 | 1/2005 | Jeddeloh |
| 2006/0047903 A1 | 3/2006 | Passerini |
| 2006/0251096 A1 | 11/2006 | Metsker |
| 2006/0265534 A1* | 11/2006 | Haga et al. .................... 710/243 |
| 2007/0086480 A1 | 4/2007 | Elzur |
| 2007/0186060 A1 | 8/2007 | Nayyar et al. |
| 2009/0113121 A1* | 4/2009 | Lee et al. ...................... 711/103 |

* cited by examiner

METHOD AND APPARATUS FOR MEMORY WRITE PERFORMANCE OPTIMIZATION IN ARCHITECTURES WITH OUT-OF-ORDER READ/REQUEST-FOR-OWNERSHIP RESPONSE

RELATED APPLICATIONS

This application is a divisional of co-pending U.S. patent application Ser. No. 11/323,765, filed on Dec. 30, 2005.

The invention relates to memory write performance in cache-coherent architectures.

BACKGROUND

Computers and data processing systems are made up of many subsystems, each to perform a portion of a processing task. One way to understand the operation of an overall system is to examine the interfaces subsystems present to each other. For example, a memory module may accept address signals, then copy data on a data bus into a memory location selected by the address when a strobe signal is asserted. Other subsystems may perform more complex functions by combining or repeatedly invoking simpler operations of lower-level units.

The interfaces can be analyzed as promises or guarantees that a module makes to its clients: "if you do A, then I will do B." Often, A and B are complex, interlocking protocols with ordering requirements or timing parameters that must be respected to ensure both deterministic and correct operation. (Violating timing requirements may cause spurious data errors, while violating order of operation rules may impair a system's logical function.)

Software often relies on interface "promises" of hardware modules. A common programming paradigm called a producer/consumer ("P/C") relationship provides an example of how changing an interface can break a system. In a P/C relationship, one process (the producer) generates data, then sets a flag when it is finished. Another process (the consumer) waits for the flag to be set, then begins to use the data. However, both data and flag may be simply values stored in memory, and logically indistinguishable to other software or hardware modules involved in reading or writing the values. If the producer writes the data and then sets the flag, but some other subsystem re-orders the memory operations so that the flag is set before the data is written, the consumer may begin processing prematurely. This example shows how failing to respect ordering interfaces can cause logical errors. (The example is of an extremely simple P/C relationship, but many other software relationships can be decomposed or logically reduced to an equivalent of a P/C relationship.)

When many modules are involved in a processing operation, it can be challenging to coordinate their interactions to achieve acceptable overall performance. Furthermore, a module's interfaces or functions may be altered when a new design permits the module to be improved in some way (e.g. to be made smaller, faster, or less expensive). These changes can ripple through related subsystems, requiring corresponding changes to maintain expected performance or to fully realize the benefits of the improved module.

Interfaces between memory and peripheral devices represent one area where careful analysis and adjustment of subsystem interactions can yield significant gains.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

In a multi-processor system with a coherent cache, non-processor devices participate in a multi-operation protocol with a cache controller before transferring data to memory. The protocol ensures that the cache remains coherent (i.e. that all cache locations contain the same data as their corresponding main memory location). A device that is to transfer a block of data to memory must issue one or more protocol requests (one request per cache-line-sized portion of the data block), wait for a response, then write the data. However, the responses may come out-of-order with respect to the issued requests. The device may be able to finish its transfer more efficiently by altering the order of its write operations, as long as the re-ordering does not violate the device's interface obligations to other subsystems.

Figure 1:
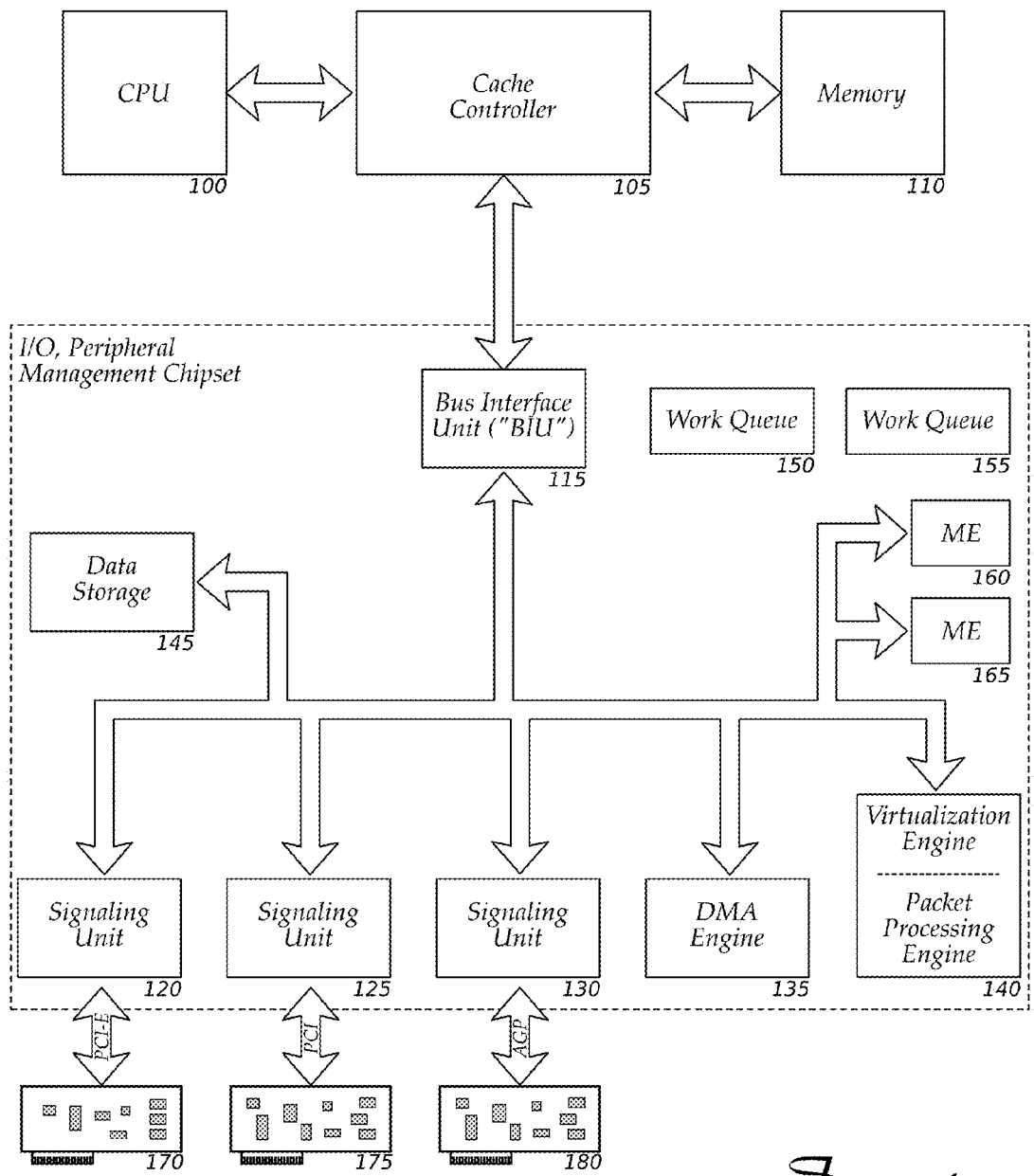
FIG. 1 shows a portion of a data processing system, including logical elements that may appear in a chipset implementing an embodiment of the invention.

FIG. 1 shows a portion of a data processing system, including a central processing unit ("CPU," also called a "processor,") 100, a cache controller 105 and a memory 110. One of the functions of cache controller 105 is to manage other modules' interactions with memory 110 so that the cache's contents are reliably coherent with memory. The storage for the cache itself may be elsewhere (for example, within CPU 100), and the cache controller may monitor modules' interactions and produce signals to invalidate certain cache entries when the underlying memory contents have changed.

Cache storage is often partitioned into blocks called "cache lines." A cache line may hold copies of several bytes of data that are stored at nearby addresses in memory 110. For example, if a module's operations result in the caching of a byte at address 0x1004E, the cache line holding a copy of that byte may also hold data from memory addresses 0x10040 through 0x1004F. Thus, in this example, a cache line holds sixteen bytes or 128 bits. Embodiments of the invention may be used with cache lines of any size.

Element 115 is a bus interface unit ("BIU") to communicate with cache controller 105. BIU 115 consolidates operations from several of the modules located "below" it: signaling units 120, 125 and 130, direct memory access ("DMA") engine 135 and virtualization/packet-processing engine ("VE/PPE") 140. These modules, or "targets," perform various functions that may be of use in the overall system's operation, and—as part of those functions—may need to write data to memory 110. The functions of some of the targets mentioned will be described so that their relationship with the methods and structures of embodiments of the invention can be understood, but those of skill in the relevant arts will recognize that other targets to provide different functions and interfaces can also benefit from the procedures disclosed herein. One could extend the concepts and methods of embodiments of the invention to targets not shown in this figure.

Other elements shown in FIG. 1 include data storage 145 to hold data temporarily for one of the other modules, work queues 150 and 155 to hold packets describing work to be done for the modules, and micro-engines 160 and 165 to perform sub-tasks related to the work.

Signaling units 120, 125 and 130 provide signals and implement protocols for interacting with hardware devices such as network interface card ("NIC") 170, mass storage interface card 175, or graphics adapter ("video card") 180. The hardware devices need not be restricted to network/storage/video cards. The signaling units 120, 125, 130 may implement one side of an industry-standard interface such as Peripheral Component Interconnect ("PCI"), PCI-Express, or Accelerated Graphics Port ("AGP"). Hardware devices that implement a corresponding interface can be connected to the appropriate signaling unit, without regard to the specific function to be performed by the device. The industry-standard interface protocols may be different from those expected or required by other parts of the system, so part of the duties of signaling units 120, 125 and 130 may be to "translate" between the protocols. For example, NIC 170 may receive a data packet from a network communication peer that it is to place in memory 110 for further processing. Signaling unit 120 may have to engage in a protocol with cache controller 105, perhaps mediated by bus interface unit 115, to complete or facilitate the transfer to memory 110. Note that the function(s) provided by the hardware devices may not affect the ordering optimizations that can be achieved by embodiments of the invention. That is, the ordering may be modified based on the promises and requirements of the interface (e.g. PCI, PCI-Express, AGP) and not based on the type of connected device (e.g. NIC, storage interface, or graphics adapter). Other devices, such as cryptographic encryption accelerators or data acquisition modules, may benefit from an embodiment's re-ordering of write operations through the underlying interface.

DMA 135 may be a programmable subsystem that can transfer data from one place in the system to another. It may provide a different interface (or set of promises) to its clients than other modules that transfer data from place to place, and may be useful because its transfers are faster or provide some other guarantees that a client needs.

Virtualization engine/packet processing engine ("VE/PPE") 140 is an interesting module that may be incorporated in some systems to support an operational mode called "virtual computing." A full description of virtual computing is beyond the scope of this disclosure, but briefly: hardware, firmware and software within a physical computing system can cooperate to create several "virtual" computing environments. "Guest" software executes within one of these environments as if it had a complete, independent physical system at its sole disposal, but in reality, all the resources the guest sees are emulated or shared from the underlying physical system, often under the control of low-level software known as a "hypervisor." Virtualization engine 140 may contribute to the creation of virtual machines by presenting virtual instances of other modules. For example, VE/PPE 140 may use signaling unit 120 and its connected NIC 170 to create several logical NICs that can be allocated to guest software running in different virtual machines. All low-level signaling and data transfer to and from the network may occur through the physical NIC 170, but VE/PPE 140 may separate traffic according to the logical NIC to which it was directed, and the main memory ("behind" the cache controller) to which it is to be written.

Data storage 145 provides temporary data storage for the various modules. This may be useful when a module's interface obligations to one subsystem include accepting an amount of data that the module cannot immediately pass through to a following subsystem because of different interface obligations to that subsystem.

When a module is moving or processing data, its functions can often be broken down into smaller units. Work queues 150 and 155 may provide a place to enqueue work packets to describe the smaller units. Micro engines 160 and 165 may then process the work packets to accomplish the module's function while respecting its interface obligations.

Figure 2:
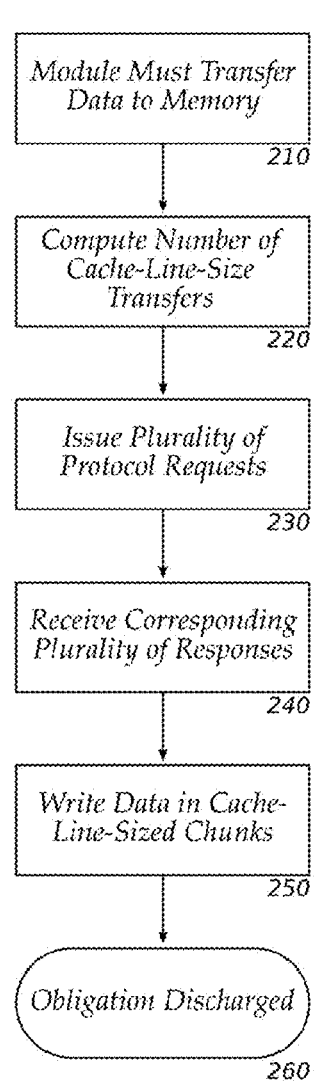
FIG. 2 is a flow chart of module interactions in a "Read/Request-For-Ownership" ("RFO") coherent cache system.

FIG. 2 is a flow chart showing a protocol that a coherent cache controller may require of a subsystem or module that wishes to write data to memory. First, the module incurs an obligation to transfer a block of data to memory (210). For example, NIC 170 may receive a data packet and pass it to signaling unit 120, with the expectation that the data will be stored. Thus, it becomes the responsibility of signaling unit 120 to write the data. As another example, a client program may issue a command to DMA engine 135 to move a block of data from one memory area to another. DMA engine must execute the command.

The obligated module may calculate a number of cache-line-sized transfers necessary to complete its writing obligation (220) and then, respecting its interface requirements to its upstream partners, issue a plurality of protocol requests to initiate a corresponding plurality of write operations (230). These requests may be issued in an order selected to reduce the load on the module given its obligations to the data source or in another order selected on some other basis. According to the upstream interface, the module may not write the data corresponding to a protocol request until it receives a response to the request.

Next, the obligated module receives a plurality of responses, each corresponding to one of the requests (240). The responses may come from an upstream partner such as cache controller 105, through bus interface unit 115. The order of the responses may be different than the order of the requests. Furthermore, a response may be significantly delayed from its corresponding request, depending on other operations occurring at the cache controller, CPU, memory, or other subsystems.

Finally, the obligated module writes the data to memory (250) in cache-line-sized chunks, where each write is performed after a corresponding protocol request has been issued, and after a corresponding protocol response has been received. The module may perform write operations in yet another order, subject only to the aforementioned restriction. Once all the chunks of the data block have been transferred to memory, the module's obligation is discharged (260).

The protocol requests described above may inform the cache controller that the module wishes to write data to memory at a particular address. The cache controller may update its internal state to indicate that the module "owns" the corresponding cache lines. The concept of a cache line owner may permit the cache controller to manage the cache and guarantee coherency more efficiently. A protocol response, then, indicates to the requester that it has acquired ownership of the cache line and may proceed to modify it by writing new data.

In one embodiment, a module may issue protocol requests according to the address of the data it wishes to write. For example, requests may be issued in a monotonically increasing (or monotonically decreasing) order of address. This order may be preferred when all the source data is available, and there is no reason to write one chunk of it before another chunk. Nevertheless, the protocol responses may come back out-of-order, so the module should be prepared to deal with them in any order. One possible procedure is to write each chunk as soon as the corresponding ownership-granting response arrives. Another is to collect responses but to write chunks in ascending (or descending) address order.

In another embodiment, a module may issue protocol requests in an order other than monotonically increasing (or decreasing) order of address. For example, if the data block to be written is arriving piecemeal, then the requests may follow the order of arrival of pieces. (The pieces may be stored in data storage 145 pending the arrival of a response that permits the data to be written.)

Figure 3:
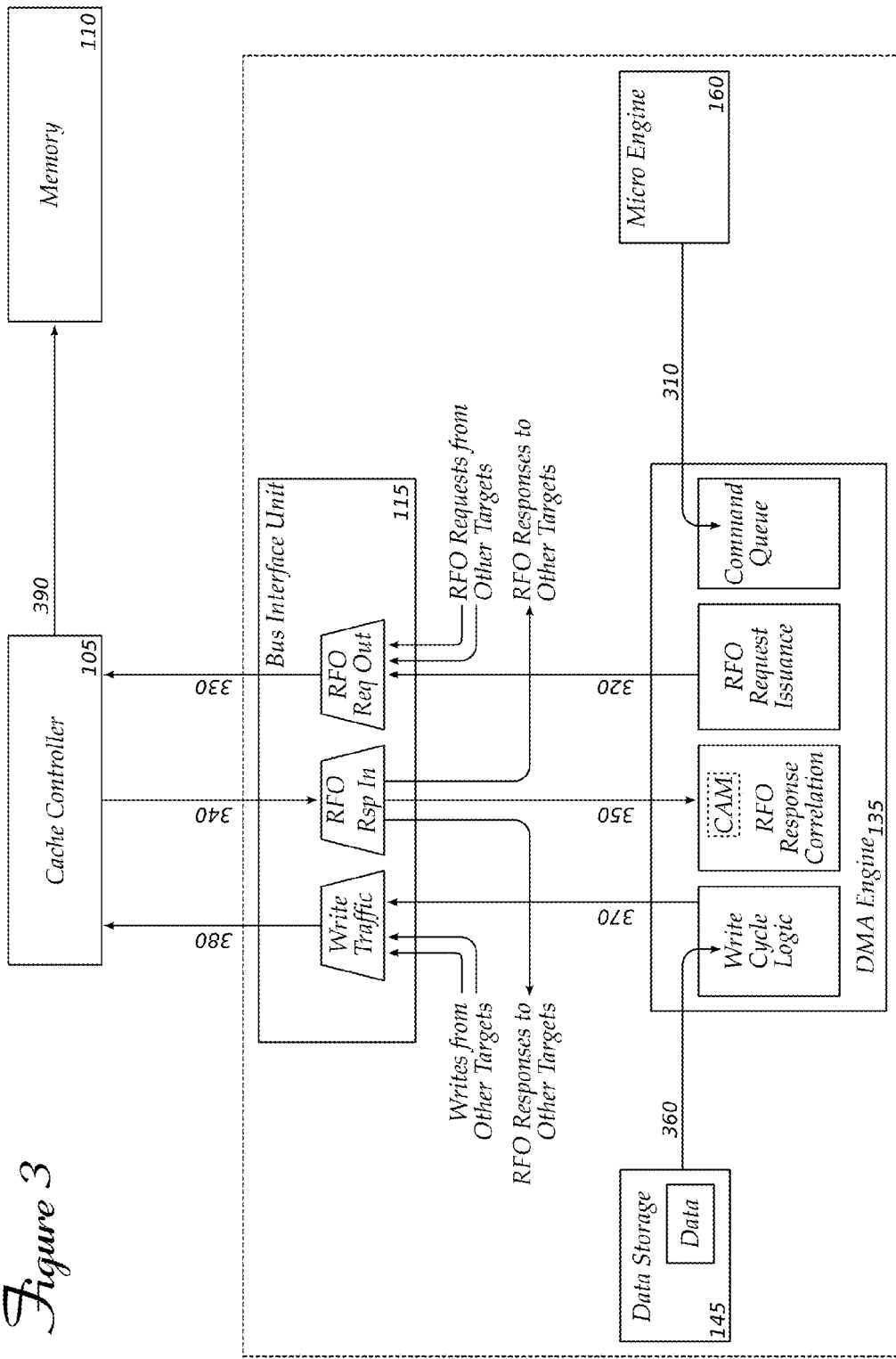
FIG. 3 shows a direct memory access ("DMA") target performing a data transfer.

Other orderings may also be chosen by some modules and in some embodiments. For example, DMA engine 135 shown in FIG. 1 may be configured by a micro-engine 160 or 165 to transfer data from data storage 145 to memory as part of performing a task on one of the work queues. A DMA transfer of, in this example, 64 cache lines of 64 bytes each (4,096 bytes total) can proceed as shown in FIG. 3. First, a micro engine programs DMA target so that it has the information necessary to execute the transfer (310). Next the DMA target issues a "read/request-for-ownership" ("RFO") protocol request to the bus interface unit (320), which forwards it to the cache controller (330). Later, an RFO response comes from the cache controller to the bus interface unit (340) and is passed to the targets. The targets, including DMA engine 135 in this example, may use a content-addressable memory ("CAM") to correlate RFO requests and responses (350). The DMA target obtains data from the data storage (360) and issues a write to the bus interface unit (370). The bus interface unit completes the cache-line write by forwarding the data to the cache controller (380) and thence to memory (390).

In this example, the DMA target has two options to ensure that a module or software entity that is waiting for the data does not begin processing before all the data has been sent: it can issue all writes in any convenient order and send an "end of transfer" signal to the micro engine after all writes are completed; or it can issue the first 63 cache line writes in any convenient order (for example, each write to be issued as soon as the RFO response arrives) then issue the last write after the preceding 63 writes have completed. These orderings can ensure that a producer-consumer ("P/C") relationship between software entities concerned with the data is maintained. The DMA target selects the order of protocol requests and write operations to avoid breaking the producer-consumer paradigm, because the target cannot (in general) know whether the data it is moving is the "data" of the P/C relationship or the "flag" to indicate the availability of new data.

On the other hand, some targets can tell whether information is the "data" or the "flag" of a P/C relationship. Or, more precisely, some targets can be certain that two write operations are not logically related, and consequently the operations may be performed in either order without risk of logical malfunction. For example, a target that caches data locally to improve its own performance may write "dirty" cache lines back to main memory in any order because the target itself is the only user of the cache lines—the target may provide no interface for a producer and a consumer to synchronize their operations on the target's cache contents, so no P/C relationship could be impaired. Targets with more detailed knowledge of their data and operations can exploit re-ordering opportunities that are not available in more general cases.

These examples illustrate how delegating write protocol ordering choices to individual targets within a peripheral or input/output management chipset can permit easier optimization of write ordering within the limitations of the targets' interfaces. Centralizing the various ordering possibilities in a single module (for example, in the bus interface unit) may increase the complexity of the module or make it slower or more expensive. ("Chipset" is a collective noun describing a circuit or group of circuits to perform a function. A chipset may be a single electronic circuit embodied as an integrated circuit ("IC"), a portion of a larger circuit, or a group of circuits connected together so that they can interact as appropriate to accomplish the function.)

Figure 4:
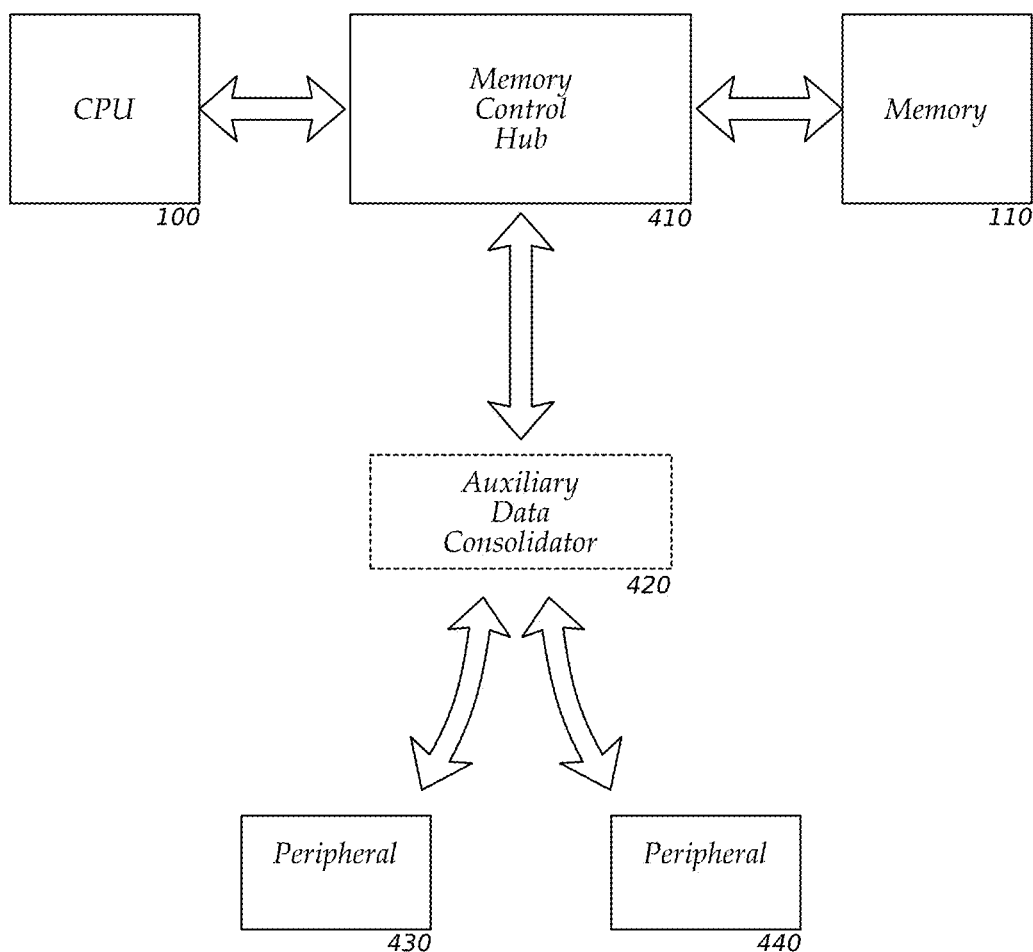
FIG. 4 shows an embodiment of the invention in an alternate system configuration.

In some embodiments, the functions of the I/O management chipset may be distributed differently than described in the previous examples and figures. FIG. 4 shows such a different configuration. CPU 100 and memory 110 may be similar or identical to the components discussed earlier. However, in this arrangement, access from CPU 100 and other memory clients such as peripherals 430 and 440 to memory 110 is mediated by memory control hub ("MCH") 410. MCH 410 may manage the RFO protocol internally, providing simpler memory interfaces to clients such as CPU 100 and peripherals 430 and 440. Some systems may use an auxiliary data consolidator 420 to reduce the complexity and number of interfaces MCH must provide (in such a system, MCH 410 would interact with consolidator 420 instead of directly with the peripherals "behind" the consolidator.) The consolidator could multiplex or otherwise group transactions from its peripherals, and de-multiplex responses from MCH 410. The peripherals themselves might be any device that could be connected to the system described with reference to FIG. 1 (for example, a network interface, a storage interface, or a video adapter).

The MCH can interact with its clients and accept memory transactions in a first order, but execute them in a second order, so long as the second order preserves the semantics of producer-consumer relationships.

The applications of the present invention have been described largely by reference to specific examples and in terms of particular allocations of functionality to certain hardware and/or software components. However, those of skill in the art will recognize that write-order optimization opportunities can also be exploited by software and hardware that distribute the functions of embodiments of this invention differently than herein described. Such variations and implementations are understood to be apprehended according to the following claims.

We claim:

1. A method, comprising:
performing the following by a DMA controller:
re-ordering a plurality of protocol requests to initiate a corresponding plurality of write operations into a first order and issuing the plurality of protocol requests in the first order toward a controller that determines order of writes to a memory;
receiving from the controller a plurality of protocol responses, each response corresponding to one of the plurality of protocol requests, the plurality of responses received in a second order that is different than the first order; and
writing to the memory in the second order data corresponding to each of the plurality of protocol requests, wherein each write in the second order is performed responsive to reception of a corresponding one of the received responses.

2. The method of claim 1 wherein each write operation has a corresponding address, the method further comprising:
issuing the plurality of protocol requests in monotonically ascending order of address.

3. The method of claim 1 wherein said DMA controller is within an I/O control hub.

4. The method of claim 3 wherein the plurality of protocol requests originate from an I/O device.

5. The method of claim 1 wherein the write operations are performed in cache line sized chunks.

6. The method of claim 1 wherein a cache controller is notified of the write operations.

* * * * *